(12) United States Patent
Fieglein et al.

(10) Patent No.: US 11,377,342 B2
(45) Date of Patent: Jul. 5, 2022

(54) FUEL DISPENSER WITH LEAK DETECTION

(71) Applicant: Wayne Fueling Systems LLC, Austin, TX (US)

(72) Inventors: Henry Fieglein, Cedar Park, TX (US); Thomas Cerovski, Cedar Park, TX (US)

(73) Assignee: WAYNE FUELING SYSTEMS LLC, Austin, TX (US)

( * ) Notice: Subject to any disclaimer, the term of this patent is extended or adjusted under 35 U.S.C. 154(b) by 276 days.

(21) Appl. No.: 15/933,617

(22) Filed: Mar. 23, 2018

(65) Prior Publication Data

US 2019/0292040 A1 Sep. 26, 2019

(51) Int. Cl.
*B67D 7/32* (2010.01)
*G06T 7/00* (2017.01)
*G06V 20/00* (2022.01)

(52) U.S. Cl.
CPC ......... *B67D 7/3209* (2013.01); *B67D 7/3218* (2013.01); *G06T 7/0002* (2013.01); *G06V 20/00* (2022.01)

(58) Field of Classification Search
CPC .................... B67D 7/3209; B67D 7/3218
See application file for complete search history.

(56) References Cited

U.S. PATENT DOCUMENTS

| | | | | |
|---|---|---|---|---|
| 6,311,547 B1* | 11/2001 | Nitecki | ................ | B67D 7/3209 137/313 |
| 2004/0186813 A1* | 9/2004 | Tedesco | ............. | G06K 9/00624 706/14 |
| 2013/0014855 A1 | 1/2013 | Yahashi et al. | | |
| 2016/0039656 A1* | 2/2016 | Walsh | ....................... | B67D 7/04 700/283 |
| 2016/0055653 A1* | 2/2016 | Badawy | .................... | G06T 7/90 348/143 |
| 2016/0159509 A1* | 6/2016 | Lewis | .................... | B67D 7/346 700/243 |
| 2017/0193810 A1* | 7/2017 | Cao | ........................ | G06F 16/784 |
| 2019/0339200 A1* | 11/2019 | Kim | ...................... | B81C 1/0038 |

FOREIGN PATENT DOCUMENTS

| | | | |
|---|---|---|---|
| JP | 63158421 A | * | 7/1988 |
| JP | 2000264398 A | | 9/2000 |
| JP | 2008-179199 A | | 8/2008 |
| KR | 10-2017-0041146 A | | 4/2017 |

OTHER PUBLICATIONS

Machine translation of KR20170041146 (Year: 2017).*
International Search Report and Written Opinion for PCT Patent International Application No. PCT/US19/23355, dated Jul. 4, 2019, 14 pages.

* cited by examiner

*Primary Examiner* — Matthew G Marini
(74) *Attorney, Agent, or Firm* — Mintz Levin Cohn Ferris Glovsky and Popeo, PC; Lisa Adams

(57) ABSTRACT

Devices, methods, and systems are provided for detection of various leaks within fuel dispensers, such as through visualization within a fuel dispenser. An exemplary fuel dispenser can include a housing having fuel dispensing components disposed therein, a control system in the housing for controlling the dispensing of fuel, and a leak detection assembly for detecting a fluid leak within the housing, and for visually confirming the presence of a leak using an imaging device.

19 Claims, 7 Drawing Sheets

FUEL DISPENSER WITH LEAK DETECTION

FIELD

Devices, methods, and systems are provided for detecting a leak in a fuel dispenser, such as through visualization within a fuel dispenser compartment.

BACKGROUND

While fuel dispensers are designed to withstand any leaks, to the extent a leak occurs it is important to detect the leak and cease operations as soon as possible. Given the highly flammable nature of fuels, such as gasoline, within fuel dispensers, regulations require periodic inspections of fuel dispensers to ensure there are no leaks or malfunctions. During such an inspection, the inspector will access the internal base cabinet of the fuel dispenser to determine if there is any fuel leaking within the housing of the dispenser. This inspection can be an invasive and time-consuming process. The fuel dispenser must be physically opened for the inspection, which means that the fuel dispenser must be shut down and the auditor must be physically onsite. Every inspection thus results in lost time by the auditor and lost profits by the fueling location.

More modern fuel dispensers can include a sensor located in the bottom pan of the base cabinet to detect the presence of water. If the sensor detects a leak, a notice will be sent to the facility. While this can be effective for early leak detection, the facility owner or an inspector must still physically access the fuel dispenser to confirm that a leak has actually occurred.

Therefore, a need exists for devices, methods, and systems for detecting and confirming the presence of a leak in a fuel dispenser.

SUMMARY

In general, devices, methods, and systems for detection of various leaks within fuel dispensers are provided herein, such as through visualization within a fuel dispenser compartment.

For example, a fuel dispenser is provided herein that has a base cabinet with fuel dispensing components that include at least one motor and at least one pump therein. The at least one pump is configured to receive fuel from a storage tank, and the at least one motor is configured to drive the at least one pump to deliver the fuel to at least one hose on the fuel dispenser for dispensing the fuel. The base cabinet has a bottom pan that is configured to receive any fluid leaking within the base cabinet. An electronics housing is disposed in the fuel dispenser isolated from the base cabinet and contains a control system that is configured to control the fuel dispensing components. A leak detection assembly is also provided in the fuel dispenser with at least one sensor that is disposed within the base cabinet and configured to sense the presence of fluid within the bottom pan. An imaging apparatus is disposed within the base cabinet and is operatively coupled to the sensor such that the imaging apparatus is activate by the sensor when the sensor detects fluid within the bottom pan. The imaging apparatus obtains at least one image of the bottom pan when the imaging apparatus is activated, and the at least one image is transmitted to a remote device for verifying the presence of fluid within the bottom pan.

The fuel dispenser can have a variety of different embodiments. For example, the at least one sensor can be configured to detect a change in weight of the bottom pan when fluid is collected in the pan. The control system can also be coupled to the at least one sensor and to the at least one imaging apparatus, and the control system can be configured to control the sensor and activate the imaging apparatus when the sensor detects fluid within the bottom pan. In another example, the control system can receive the at least one image and transmit the image to a remote device. The at least one sensor can be mounted within the base pan. The at least one imaging apparatus can also be mounted to a sidewall of the base cabinet. The at least one sensor can be a pressure sensor. In another example, the at least one imaging apparatus can be configured to take periodic images of the bottom pan. The leak detection assembly can also be configured to automatically disable the fuel dispensing components disposed in the housing upon detection of the fluid within the bottom pan by the at least one sensor.

In another aspect, a fuel dispenser is provided that includes a sensor configured to detect the presence of fluid in a bottom pan of a base cabinet of a fuel dispenser, and to output a detection signal containing data representing detection of the presence of fluid. An imaging device is positioned within the base cabinet and is configured to acquire at least one image of the bottom pan in response to receipt of the detection signal and output an imaging signal containing data representing the at least one image.

The dispenser can have numerous variations. For example, the sensor can be configured to output the detection signal to the imaging device. In another example, the sensor can be configured to measure an amount of the detected fluid and output the detection signal including data representing the measured amount of the detected fluid. The fuel dispenser can also include a control system in an electronics module of the fuel sensor. The control system can be configured to receive the detection signal from the sensor and output the detection signal to the imaging device when the measured amount of the detected fluid exceeds a first fluid threshold. In another example, the fuel dispenser can include a control system in an electronics module of the fuel sensor, and the control system can be configured to receive the imaging signal from the imaging device and identify the presence of fluid based upon the at least one image. In another example, the fuel dispenser can include a pump positioned within the base cabinet and configured to draw a fluid fuel from a reservoir. The control system can be configured to determine an amount of the detected fluid contained within the bottom pan based upon the at least one image and transmit a shutdown signal to the pump when the amount of detected fluid exceeds a second fluid threshold. The shutdown signal can cause the pump to halt draw of fluid fuel from the reservoir upon receipt. In yet another example, the fuel dispenser can include a notifier that is configured to generate at least one notification. The control system can be configured to determine an amount of the detected fluid contained within the bottom pan based upon the at least one image and transmit a notification signal to the notifier when the amount of detected fluid is less than a second fluid threshold such that the notification signal causes the notifier to generate the at least one notification. In an exemplary embodiment, the fuel dispenser can include a user interface and a pump, and the user interface can be configured to receive the imaging signal from the imaging device, display the at least one image, and receive a first user input after display of the at least one image and transmit a shutdown signal to the pump. The pump can be positioned within the base cabinet and can be configured to draw a fluid fuel from a reservoir prior to receipt of the shutdown signal and halt draw of the fluid fuel from the reservoir upon receipt of the shutdown signal. In another example, the user interface can be mounted to a frame of the fuel dispenser. The fuel dispenser can also include a user interface and a notifier, and the user interface can be configured to receive the imaging signal from the imaging device, display the at least one image, and receive a second user input after display of the at least one image and transmit a notification signal to the notifier. The notifier can be configured to generate at least one notification in response to receipt of the notification signal.

BRIEF DESCRIPTION OF THE DRAWINGS

The invention will be more fully understood from the following detailed description taken in conjunction with the accompanying drawings, in which.

DETAILED DESCRIPTION

Figure 1A:
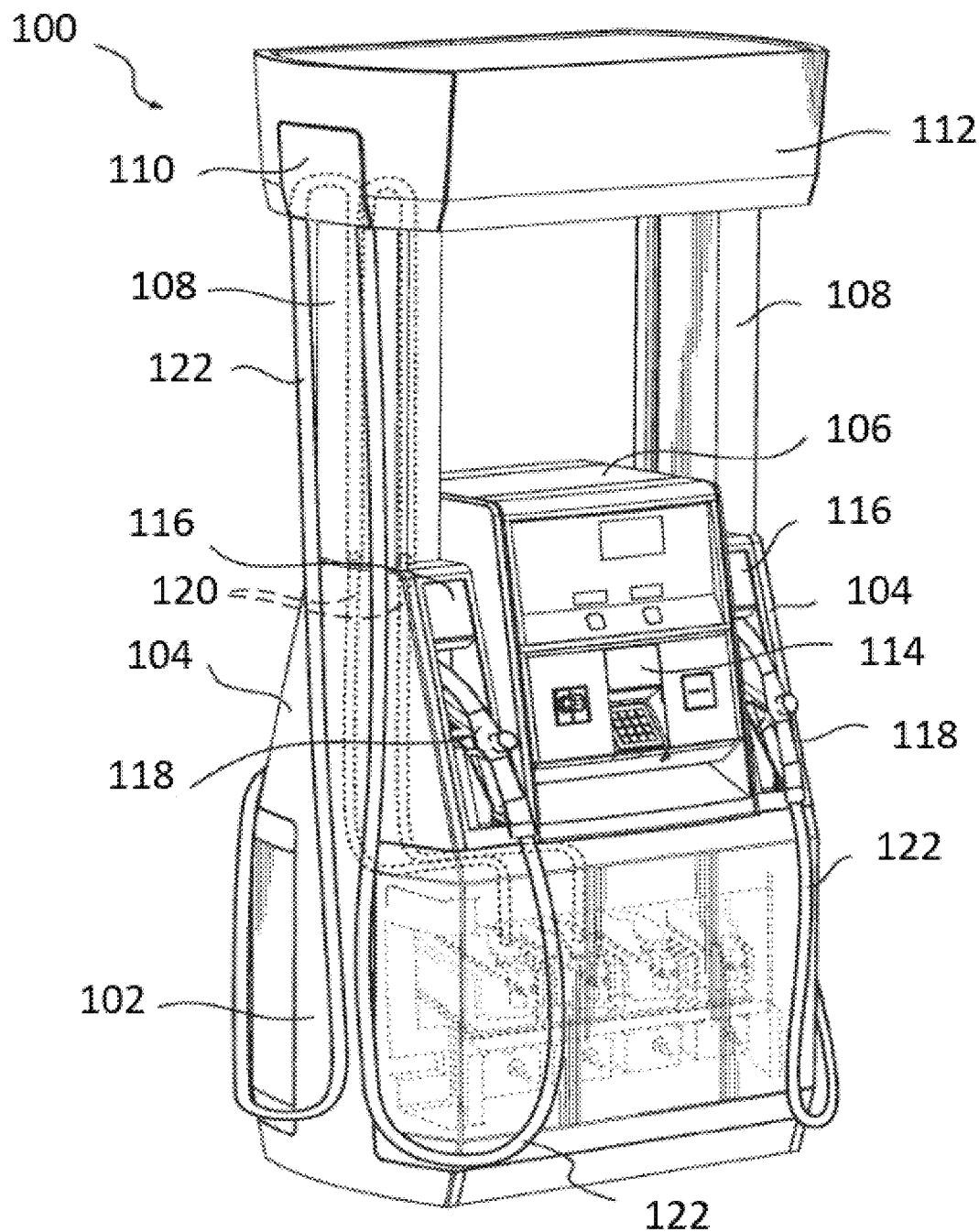
FIG. 1A is a perspective, partially transparent view of one embodiment of a fuel dispenser unit.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," "or in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Devices, systems, and methods for detecting various leaks within fuel dispensers are provided herein. The devices, systems, and methods can be used with various fuel dispensers, such as a gasoline fuel dispenser at a fueling station. In an exemplary embodiment, a leak detection assembly is provided that is configured to detect fluid within a bottom pan of a base cabinet of a fuel dispenser, and, upon detection of fluid, to activate an imaging apparatus within the base cabinet to cause the imaging apparatus to obtain an image of the bottom pan. The image can be transmitted to an external location, where the image can be viewed to confirm the presence of an actual fluid leak within the fuel dispenser.

In various embodiments, the leak detection mechanism can include at least one sensor and at least one imaging apparatus. For example, a bottom pan can be positioned within the base cabinet and it can collect any fluid leaking into or within the cabinet. One or more sensors within the base cabinet can be configured to detect the presence of fluid within the bottom pan. Various techniques can be used to detect the presence of fluid. When fluid is detected, the sensor(s) can transmit a signal to one or more imaging devices within the base cabinet, thereby causing the imaging device to obtain one or more images of the bottom pan. The image(s) can be transmitted or broadcast to a remote location, such as to the operator of the fueling facility or to someone located remote from the fuel station, wherein the images can be viewed and the presence of fluid can be confirmed. In certain embodiments, when a sensor detects the presence of fluid, the fuel dispenser can be deactivated or turned out to prevent use until the presence of fluid is verified based on the images. In other embodiments, the fuel dispenser can continue to operate until a user verifies the presence of fluid, at which point the user can deactivate the dispenser. In other embodiments, the fuel dispenser can be configured to receive a response from a remote user, either verifying the presence of fluid or indicating that no fluid is present, in which case the fuel dispenser can either turn off or can continue to operate. In yet other aspects, the imaging apparatus can include recognition software that is configured to read the images and identify whether fluid is present in the images. The recognition software can be coupled to the fuel dispenser control system, allowing the recognition software to notify the system if fluid is sensed and verified, allowing the control system to deactivate the fuel dispenser. If fluid is detected and the fuel dispenser is deactivate, appropriate maintenance can be performed on the fuel dispenser to repair the leak. Through use of the leak detection assembly, the cost of inspection can be reduced while the ease of inspection can be increased. For example, shutting down and opening the fuel dispenser will not be required to perform basic inspections, and fuel leaks can be detected and confirmed almost instantaneously.

While the leak detection assembly can be used in a variety of situations and it is not necessarily limited to use with a fuel dispenser, by way of non-limiting example, FIG. 1A illustrates one embodiment of a fuel dispenser 100. The configuration of the fuel dispenser unit 100 can vary depending on the exact components included, but in the illustrated embodiment the fuel dispenser 100 generally includes a base cabinet 102, an electronics cabinet 106, and various other housing components such as one or more nozzle modules 104, one or more columns 108, a top module 110, and one or more display sections 112. As shown in FIG. 1A, the base cabinet 102 can be placed on the ground at a suitable location for the fuel dispenser 100. The electronics cabinet 106 is positioned on top of the base cabinet 102, whereby a user interface unit 114 can be located at a suitable height for a user operating the fuel dispenser 100. The user interface unit 114 can be configured to allow a user/customer to conduct a transaction at the fuel dispenser 100, and thus can include a variety of input and output devices, such as a keypad or touchscreen, a display for displaying various information (e.g., price, fuel volume, etc.), octane selection buttons, etc. In the illustrated embodiment, two nozzle modules 104 are provided, with one on each side of the electronics cabinet 106. Each nozzle module 104 can include at least one nozzle boot 116 configured to receive a nozzle 118. A corresponding column 108 can be placed on top of each nozzle module 104, and the two columns 108 can in turn provide support to the top module 110, as illustrated in FIG. 1A. The display section 112 with display surfaces for advertisement and/or informational materials can be optionally placed on top of the top module 110 and can partially enclose the top module 110. A person skilled in the art will appreciate that the fuel dispenser 100 can have a variety of other configurations, and can have any number of housing components, and FIG. 1A is just one embodiment a fuel dispenser that can be used with the leak detection assembly disclosed herein.

In some embodiments, the fuel dispenser 100 can include a tube arrangement 120 and one or more hoses 122 connected thereto for transporting fuel from an underground fuel reservoir (not shown) to the nozzles 118. The tube arrangement 120 can have a first end coupled to the base cabinet 102, which in turn can communicate with an underground fuel reservoir, and a second end coupled to a hose 122. Each hose 122 can be coupled to a corresponding nozzle 118 on one or more sides of the fuel dispenser 100. Each of the nozzles 118 can be seated in the nozzle boot 16 when not in use.

Fuel flow can travel through and be controlled by components located in the base cabinet 102 of the fuel dispenser 100. For example, fuel from the underground fuel reservoir can be pumped through a piping network into an inlet or fuel dispensing pipes using one or more fuel pumps and motors located in the base cabinet 102. When fuel is dispensed, it travels through a meter (not shown) located in the base cabinet 102, which is responsive to flow rate or volume. A pulser (not shown) can be employed to generate a signal in response to fuel movement through the meter. A data line provides a signaling path from the pulser to a control system, indicating the flow rate or volume of fuel being dispensed within the meter. As the refueling operation progresses, fuel is delivered through the hose 122 and the nozzle 118 into a customer's vehicle (not shown).

Figure 1B:
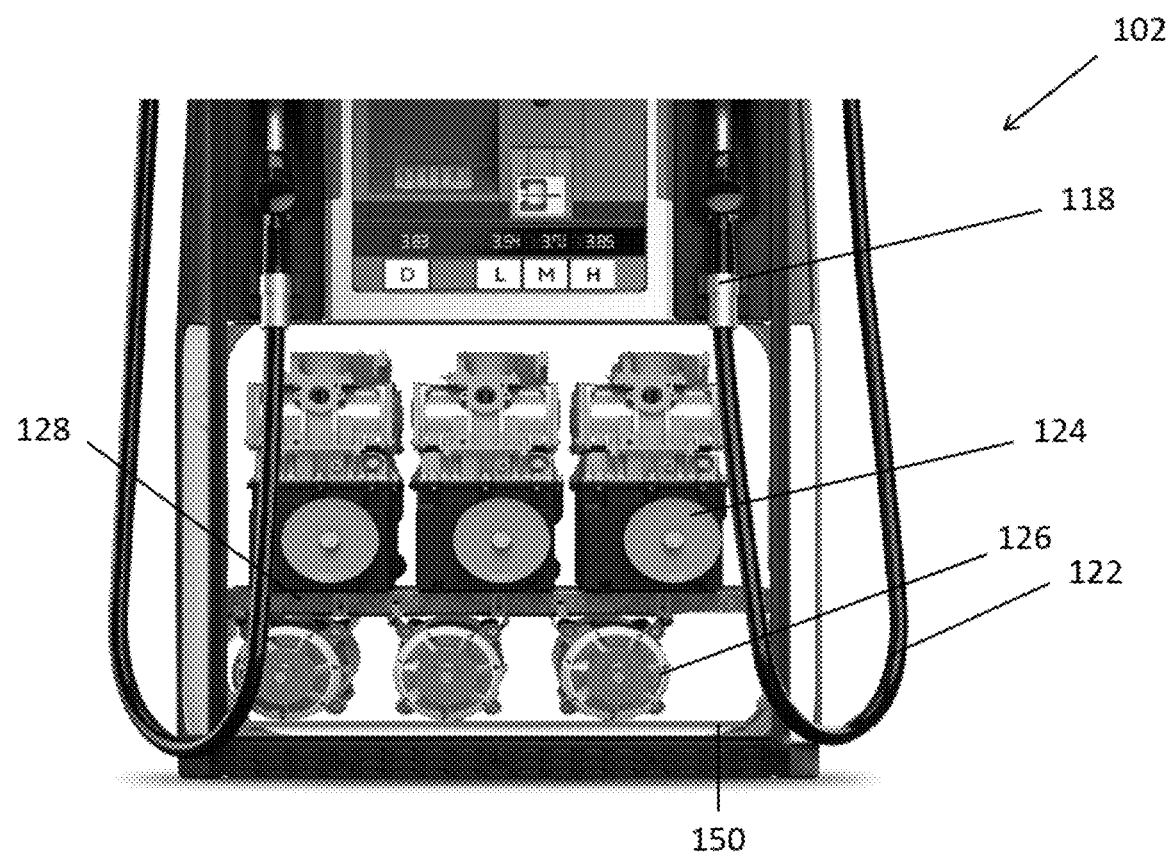
FIG. 1B is an internal perspective view of a portion of the fuel dispenser unit of FIG. 1A, showing multiple motor and pump assemblies disposed within a base cabinet of the fuel dispenser unit.

FIG. 1B illustrates some of the internal components of the base cabinet 102 in more detail, and in particular the components that are effective to transfer fuel from the underground reservoir to a vehicle's fuel tank. In general, fuel pumps and electrical motors utilized by a fuel dispenser unit can be assembled in either a centrifugal pump-motor configuration, where the pumps and motors are submerged beneath the fuel in the underground fuel reservoir; or the pumps and motors can be assembled in a positive displacement configuration such as by using suction pumps and can be mounted above ground and inside a cabinet, as shown in this illustrated embodiment. All such variations of fuel dispensing components can be used in the fuel dispensers discussed herein. As shown in FIG. 1B, the base cabinet 102 includes one or more fuel pumps 124 powered by one or more electrical motors 126. The fuel pumps 124 can be seated on top of a shelf 128 and can be configured to draw fuel from the underground reservoir, and each pump 124 can be powered by the electrical motor 126 mounted underneath the shelf 128. The fuel is subsequently supplied to a vehicle's fuel tank through the hoses 122 and nozzles 118. For example, activation of a switch on the fuel dispenser 100 activates the electrically powered motored 126 to drive fuel pump 124, causing the fuel to flow therethrough and to eventually be dispensed from the nozzle 118 at the end of the dispensing hose 122.

It is possible for one or more components within the housing to leak fuel as it is pumped through the cabinet 102 and to the hoses 122. The base cabinet 102 can thus include a bottom pan 150, which can be part of the base cabinet 102 or which can be a separate pan located within the base cabinet 102. The bottom pan 150 can collect any leaking or spilling fuel within the base cabinet 102. The pan 150 can be configured to be examined on a repeating basis to ensure that no leaks have occurred and that the internal components of the fuel dispenser 100 are operating as expected. However, manual examination can be expensive and time-consuming. Thus in various embodiments, detection of leaks can be accomplished through means other than manual inspection, such as through use of a leak detection assembly.

Figure 2A:
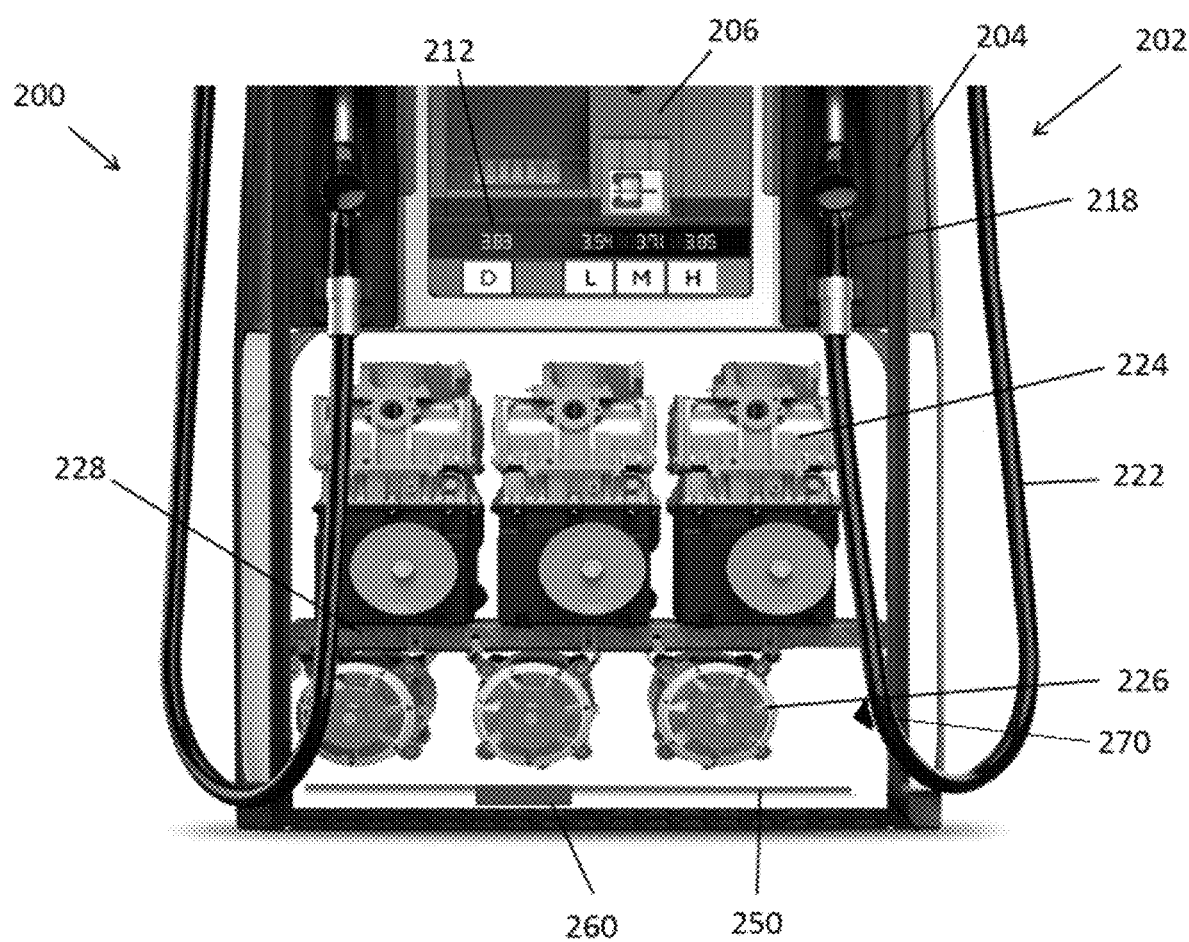
FIG. 2A is an internal perspective view of a portion of another embodiment of a fuel dispenser unit with a leak detection assembly therein.

FIG. 2A illustrates one embodiment of a fuel dispenser 200 similar to fuel dispenser 100. The illustrated fuel dispenser 200 includes a base cabinet 202 and an electronics cabinet 206 that is fluidly isolated from the base cabinet 202. The illustrated dispenser 200 also includes one or more nozzle modules 204, one or more columns and a top module (not shown), one or more display sections 212, and a control system 240 in the electronics cabinet 206 for operating the fuel dispenser 200. As with fuel dispenser 100, the base module 202 includes one or more fuel pumps 224 powered by one or more electrical motors 226. The fuel pumps 224 can be seated on top of a shelf 228 and can be configured to draw fuel from an underground reservoir. The fuel is subsequently supplied to a vehicle's fuel tank through the hoses 222 and nozzles 218.

The illustrated fuel dispenser 200 can also have a bottom pan 250 located at the bottom of the base cabinet 202 to collect any leaking or spilling fuel within the base cabinet 202. The bottom pan 250 can take a variety of forms, depending on the fuel dispenser 200. The bottom pan can be a simple flat pan with a lip thereon such that the bottom pan 250 can collect fluid therein. The bottom pan 250 can be made from a variety of materials, such as one or more plastics, metals, polymers, etc. While the bottom pan 250 can be manually examined if required, a leak detection assembly can be incorporated into the base cabinet 202 to reduce or prevent the need for manual inspection. The leak detection assembly can include one or more sensors 260 and one or more imaging devices 270.

The one or more sensors 260 can be disposed within the base cabinet 202 and can be configured to detect a possible leak, such as being configured to detect fluid in the bottom pan 250. The sensors 260 can take a variety of forms, such as being pressure sensors, weight sensors, or fluid sensors. The term "sensor" is used herein to refer to any device or method for detecting the presence of fluid, and other methods include hydrostatic testing, infrared testing, laser technology, etc. For example, there can be liquid and/or water sensors, such as a mesh, placed in the pan or in the bottom of the cabinet such that a signal and/or alarm is triggered when a certain amount of the mesh has been covered, such as more than 25%, more than 50%, etc., and/or weight sensors, for example, using a variety of balancing or spring mechanisms involving two or more contacts that come into contact with each other if enough weight from leaking fluid enters the pan to depress or unbalance the balancing or spring mechanism(s). In the embodiment shown in FIG. 2A, the one or more sensors 260 are pressure sensors that are formed in or positioned under the bottom pan 250. If fluid leaks inside the base cabinet 202 and is collected in the bottom pan 250, the sensors 260 can detect the change in weight of the pan 250 and can be configured to determine that a possible leak has occurred based on the change in weight. However, in other embodiments the sensors can be disposed in the pan itself or in a bottom of the base cabinet 202 generally and they can be configured to detect the presence of fluid.

The one or more imaging devices 270 can be installed within the base cabinet 202 and they can be configured to view the bottom pan 250. The imaging devices 270 can be actuated by the sensors 260 or by the control system 240, as discussed below, to take images of the bottom pan 250 upon detection of a possible leak within the base cabinet 202 by the sensors 260. However, the imaging devices 270 can also be configured to take images of the pan 250 on a periodic basis, such as once a month, once a week, once a day, etc. This can be set by the manufacturer, installer, and/or a later user. The imaging devices 270 can also be configured to take real-time images and/or show a constant video stream of the bottom pan 250. The imaging devices 270 can have a variety of different forms or variations, as needed to operate within the constricted space and low light levels of an interior of the base cabinet 202, such as low light cameras commonly found in a variety of low light scenarios. For example, the imaging devices 270 can be in the form of cameras that are disposed at various points within the base cabinet 202, for example on one or both sidewalls within the interior of the base cabinet 202 with a view of the bottom pan 250 or integrated with the bottom pan 250. FIG. 2A illustrates a camera on one sidewall of the base cabinet 202, with the camera being oriented toward the bottom pan 250. The imaging devices 270 can be in communication with the sensors 260 and/or with the control system 240.

Figure 2B:
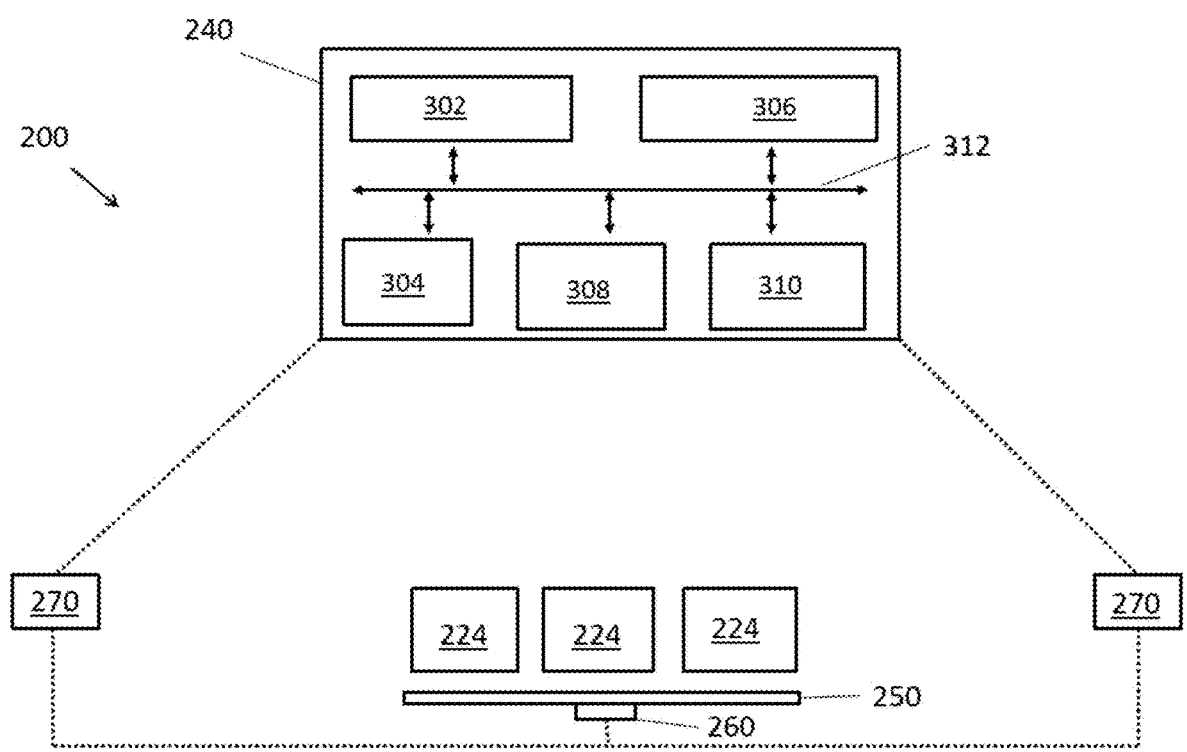
FIG. 2B is a diagram of the leak detection assembly of FIG. 2A.

FIG. 2B illustrates a simplified diagram of the leak detection mechanism of the fuel dispenser 200 with the control system 240. As shown in FIG. 2B, the control system 240 includes one or more processors 302 that can control the operation of the control system 240. The processor(s) 302 can include any type of microprocessor or central processing unit (CPU), including programmable general-purpose or special-purpose microprocessors and/or any one of a variety of proprietary or commercially available single or multi-processor systems. The control system 240 can also include one or more memories 304, which can provide temporary storage for code to be executed by the processor(s) 302 or for data acquired from one or more users, storage devices, and/or databases, such as the images from the one or more imaging devices 270 or the data from the one or more sensors 260. The memory 304 can include read-only memory (ROM), flash memory, one or more varieties of random access memory (RAM) (e.g., static RAM (SRAM), dynamic RAM (DRAM), or synchronous DRAM (SDRAM)), and/or a combination of memory technologies. The various elements of the control system 240 can be coupled to a bus system 312. The illustrated bus system 312 is an abstraction that represents any one or more separate physical busses, communication lines/interfaces, and/or multi-drop or point-to-point connections, connected by appropriate bridges, adapters, and/or controllers. The control system 240 can also include one or more network interface(s) and/or switch(es) 306, one or more input/output (IO) interface(s) 308 that can include one or more interface components, and one or more storage device(s) 310.

The network interface(s) 306 can enable the control system 240 to communicate with remote devices, e.g., remote networks for storing images taken by the imaging devices 270 and/or notification systems for notifying a user of a possible leak detected by the sensors 260, over a network, such as communication with cloud servers. The network interface(s) 306 can be, for non-limiting example, remote desktop connection interfaces, various Transmission Control Protocol/Internet Protocol (TCP/IP) mechanisms, Ethernet adapters, and/or other local area network (LAN) adapters, etc. The IO interface(s) 308 can include one or more interface components to connect the control system 240 with other electronic equipment, such as the sensors 260 and/or the imaging devices 270. For non-limiting example, the IO interface(s) 308 can include high-speed data ports, such as universal serial bus (USB) ports, 1394 ports, Wi-Fi, Bluetooth, etc. Additionally, the control system 240 can be accessible to a human user, and thus the 10 interface(s) 308 can include displays, speakers, keyboards, pointing devices, and/or various other video, audio, or alphanumeric interfaces separate and distinct from the inputs and displays configured for use by a customer of the fuel dispenser 200. The storage device(s) 310 can include any conventional medium for storing data in a non-volatile and/or non-transient manner. The storage device(s) 310 can thus hold data and/or instructions in a persistent state, i.e., the value(s) are retained despite interruption of power to the computer system 300. The storage device(s) 410 can include one or more hard disk drives, flash drives, USB drives, optical drives, various media cards, diskettes, compact discs, and/or any combination thereof and can be directly connected to the control system 240 or remotely connected thereto, such as over a network. In an exemplary embodiment, the storage device(s) 310 can include a tangible or non-transitory computer readable medium configured to store data, e.g., a hard disk drive, a flash drive, a USB drive, an optical drive, a media card, a diskette, a compact disc, etc.

During normal operation of the fuel dispenser 200, a user can use the fuel dispenser 200 by interacting with the electronics module 206 and pumping fuel using the nozzles 218. During operation, the one or more imaging devices 270 can take images of the pan 250 on a periodic, repeating basis or only when activated, and they can transmit the images to a remote storage device either directly or using the control system 240. The one or more sensors 260 can continuously or periodically monitor the bottom pan 250, but may take no action during normal operation. If a leak is detected, for example if the sensors 260 detect a change in weight of the bottom pan 250, the sensors 260 can activate the imaging devices 270 and/or the notification system in the control system 240. The imaging devices 270 can be directly activated by the sensors 260 or can be activated by the control system 240 in response to detection of a leak by the sensors 260. Upon activation, the imaging devices 270 can take one or more images of the pan 250 and transmit the image(s) to the remote storage device, as discussed in detail above. A user is thus notified of the possible leak in the base cabinet 202 by the notification system and can then access the images of the bottom pan 250 by accessing the remote storage device. The user can then take appropriate action depending on the scenario and the severity of the leak.

Figure 3A:
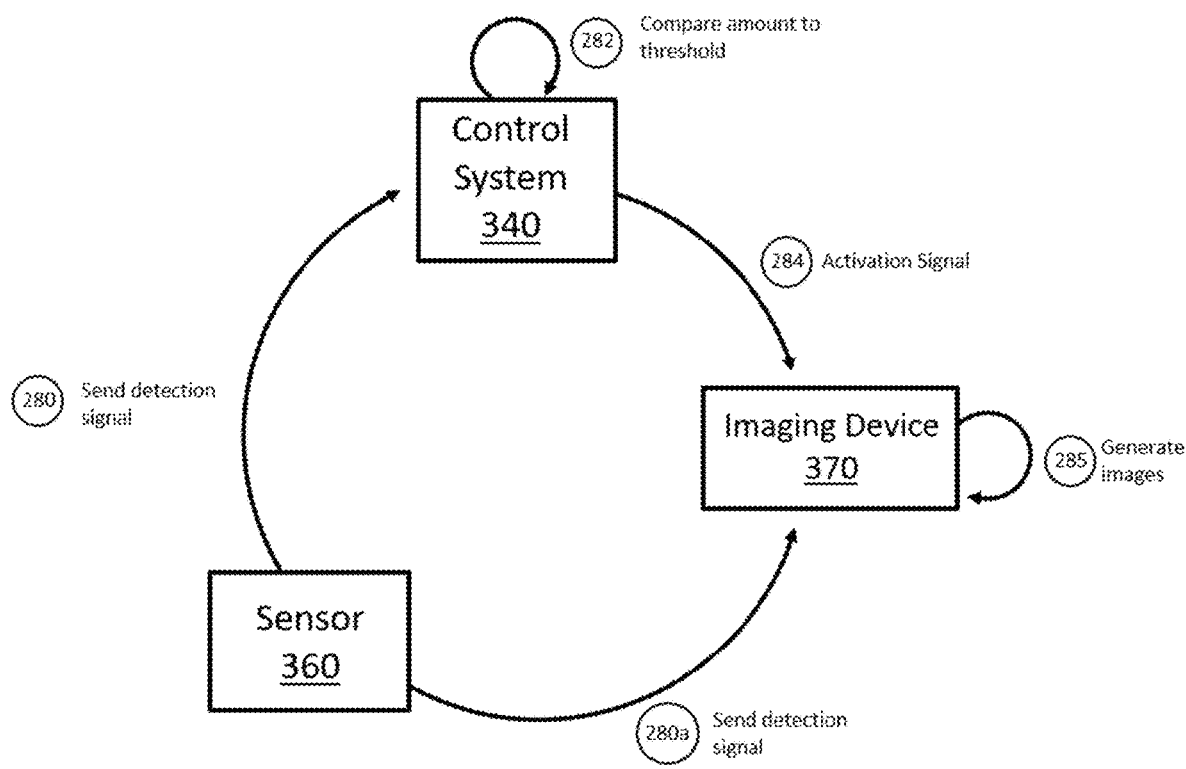
FIG. 3A illustrates a flow diagram of an embodiment of a leak detection assembly.

The various elements illustrated in FIG. 2B of the control system 240 are exemplary elements, and not all of the elements need be present in other embodiments of the control system. A control system can also include any of a variety of other software and/or hardware components, including by way of non-limiting example, operating systems and database management systems. Although the exemplary control system 240 is depicted and described herein, it will be appreciated that this is for sake of generality and convenience. In other embodiments, the computer system may differ in architecture and operation from that shown and described here. Additionally, the control system associated with a leak detection assembly does not have to be the same control system as the fuel dispenser. For example, FIG. 3A illustrates a leak detection assembly with one or more sensors 360 and one or more imaging devices 370 similar to the leak detection assembly discussed above and that can be incorporated into a fuel dispenser similar to the fuel dispenser 200. When a leak is detected by any one of the sensors 360, the sensor(s) 360 can either transmit a signal to one or more imaging devices 370 or the imaging devices 370 can continuously monitor the sensors 360 to determine when a sensed condition changes, i.e., when a leak is detected or an alarm has been triggered, as illustrated in step 280.

In other aspects, the sensors 360 can be coupled to a control system 340 and the sensors 360 can either send a signal to the control system 360 notifying the control system 340 that a leak has been detected, as illustrated in step 280*a*, or the control system 340 can control and monitor the sensors 360 to detect the presence of a leak. In certain embodiments, the control system 340 can control the sensors 360 to cause the sensors to continuously or periodically measure or otherwise determine if a leak is present, for example by comparing the amount of fluid detected to a preset threshold amount that represents a definite leak as illustrated in step 282 as opposed to a few drops of fluid. Once the control system 340 is notified or detects a leak, the control system 340 can transmit an activation signal to the one or more imaging devices 370 at step 284, thereby activating the imaging devices 370 to generate one or more images of a bottom pan 350 at step 285. The image(s) can be a still image or a video taken for a period of time. Once the imaging devices 370 have obtained the image(s), the imaging devices 370 can perform a number of different steps, as will be discussed in more detail below, for example with respect to FIG. 3B.

Figure 3B:
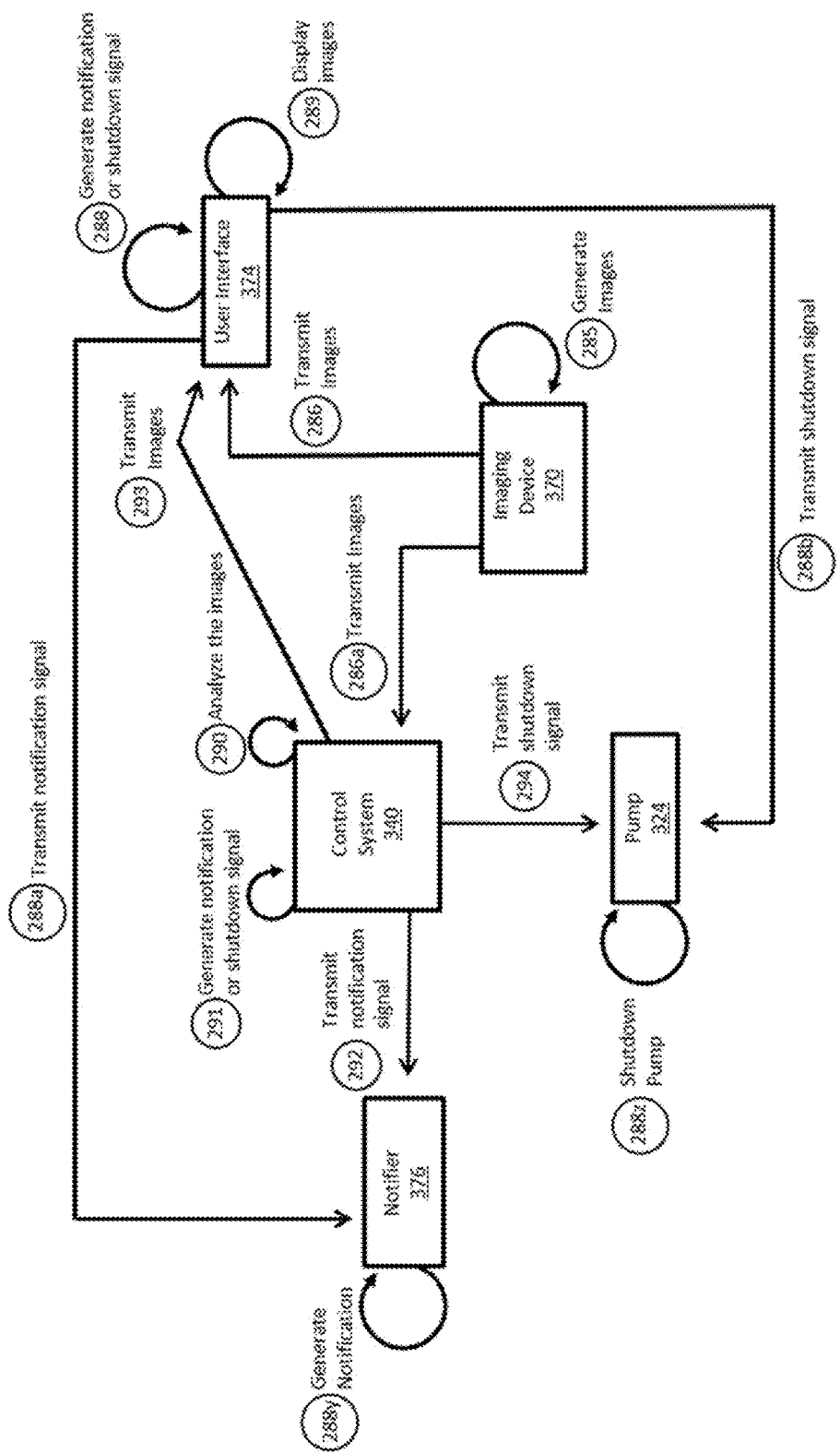
FIG. 3B illustrates another flow diagram of the leak detection assembly of FIG. 3A.

As shown in FIG. 3B, the imaging devices 370 can transmit the images to a user interface 274 at step 286. The user interface 274 can take a variety of forms and have a variety of components similar to the control system 340 discussed above. For instance, the interface 274 can take the form of a remotely placed interface such as a computer of the owner of the fuel dispenser 200 and/or the display section 212 of the electronics cabinet 206 of the fuel dispenser 200. When the user interface 274 receives the images, the user interface 274 can take a variety of steps either automatically in reaction to the received images or in response to user input when a user interacts with the interface 274. For example, the user interface 274 can generate notification or shutdown signals at step 288, and can transmit the notification signal to a notifier 276 at step 288*a* for generation of a notification at step 288*y* to a user and/or can transmit the shutdown signal to one or more pumps 224 at step 288*b* to shut down the pump 224 at step 288*z*. While the shutdown signal is illustrated herein as shutting down the pump 224, shut down of the fuel pump can be achieved in a variety of ways. For example, power to the pump 224 can be turned off, one or more valves can be incorporated into the fuel dispenser 200 and serve as shutoff valves, etc. The user interface 274 can also display the images on the user interface 274 or on a remote device at step 289.

Alternatively or additionally, the imaging devices 370 can also transmit the images to the control system 340 at step 286*a*. The control system 340 can receive or obtain the image(s) from the one or more imaging devices 370, and it can take various steps based on the images. In one embodiment, the control system 340 can analyze the image(s) at step 290, e.g., using visual recognition software, to identify whether any fluid is present in the image(s) and/or if fluid in the image meets a predefined threshold amount of fluid. If fluid is not present and/or the fluid present does not meet the threshold required, the control system 340 can do nothing, it can perform a reset function or other function, and/or it can notify a remote user that a false-alarm occurred by generating a notification signal at step 291 and sending it to the notifier 276 at step 292, which in turn can generate a notification for a user at step 288*y*. If fluid is present, the control system 340 can deactivate, i.e., turn off, the fuel dispenser 200 and/or an individual pump 224 by sending a shutdown signal, for example to one or more pumps 224 at step 294 to shut down the pump 224 at step 288*z* to prevent further use. Alternatively or additionally, the control system 340 can send a notification signal to the notifier 276 at step 292, which again can generate a notification to notify an on-site or to a remote user at step 288*y*. The control system 340 can also optionally send one or more images to the user interface 274 at step 293 to allow one or more users to view the images, for example after the control system 340 has analyzed the images at step 290.

The control system 340 itself can include various transmitting or broadcasting means therein, as discussed above with respect to the control system 240, so that a user, such as a merchant who owns the fuel dispenser and/or an authorized service organization, can be notified of the possible leak. For example, the control system 340 can transmit a signal through a wired connection or wirelessly using various techniques.

In various other embodiments, the one or more sensors can also be configured to take additional actions, such as automatically disabling or shutting down the fuel dispenser and/or one or more individual pumps to prevent additional leaking while the user addresses the current leak rather than proceeding through imaging the pan 350.

In certain embodiments, a particular imaging device can be activated based on detection of a leak by one of the sensors. For example, each sensor can be located within a particular region of the bottom pan, and each region can be associated with an imaging device configured to capture images of that region. If the sensor within a particular region detects a leak, the imaging device associated with that region can be activated to capture an image of that particular region.

Figure 4:
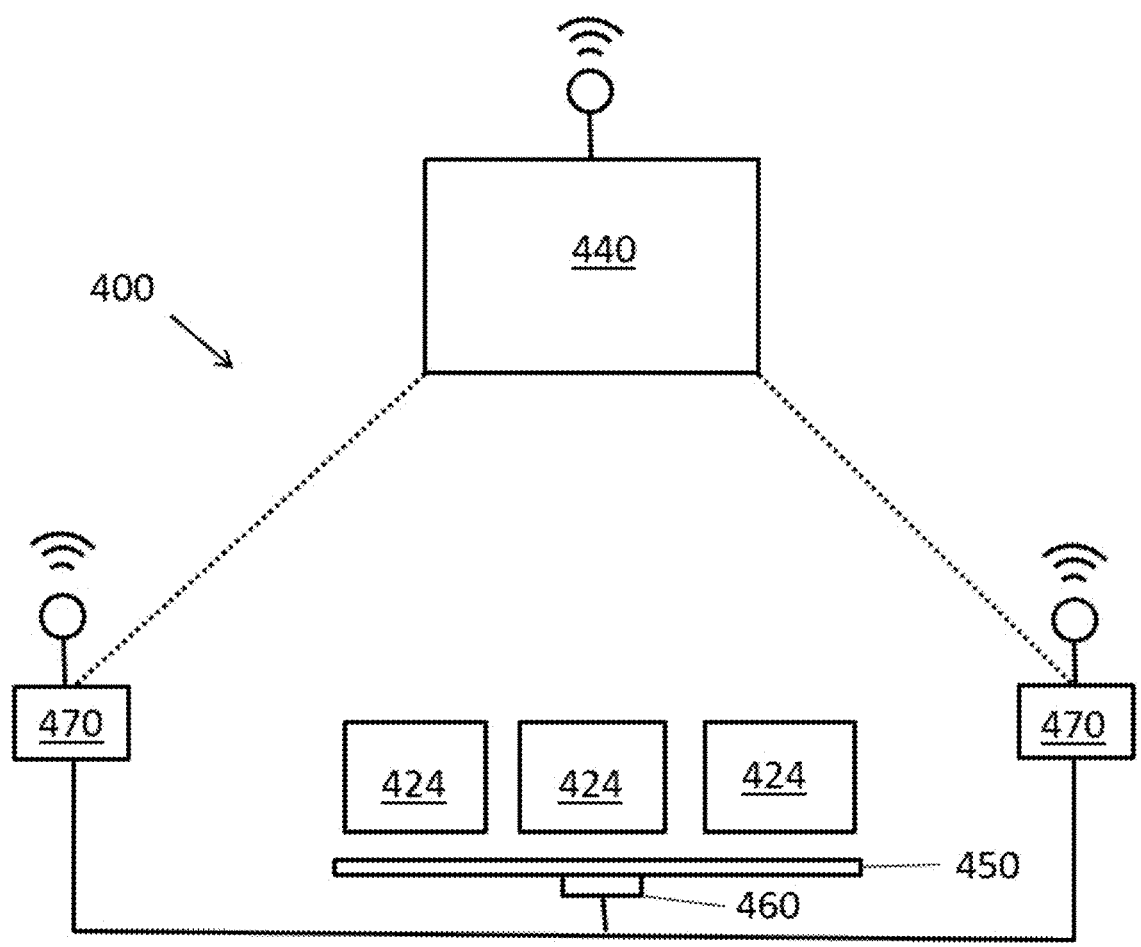
FIG. 4 is a diagram of another embodiment of a leak detection assembly in another embodiment of a fuel dispenser unit.

While the control system 240 discussed above and illustrated in FIGS. 2A and 2B is coupled to the imaging devices 270 and to the sensors directly, in other embodiments the imaging devices and/or sensors can be standalone and/or isolated components that can be configured to communicate directly with a remote network switch through various TCP/IP protocols and/or other wireless communication means (as described above). For example, FIG. 4 illustrates a diagram of a leak detection assembly within a fuel dispenser 400 similar to fuel dispenser 100. As illustrated, the fuel dispenser 400 has one or more meters/pumps 424, similar to those discussed above, and the leak detection mechanism includes a bottom pan 450, one or more sensors 460, and one or more imaging devices 470, also similar to those discussed above. The imaging devices 470 are configured to point at the pan 450, and the sensors 460 are configured to detect a possible leak being collected in the pan 450. Upon detection of a possible leak, the sensors 460 are configured to actuate the imaging devices 470, which then transmit images of the bottom pan 450 to a remote network switch 440 using various wireless communication means (as described above).

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A fuel dispenser, comprising:
   a base cabinet having fuel dispensing components that include at least one motor and at least one pump therein, the at least one pump being configured to receive fuel from a storage tank and the at least one motor being configured to drive the at least one pump to deliver the fuel to at least one hose on the fuel dispenser for dispensing the fuel, the base cabinet having a bottom pan configured to receive any fluid leaking within the base cabinet;
   an electronics housing isolated from the base cabinet and containing a control system configured to control the fuel dispensing components; and
   a leak detection assembly comprising:
      at least one sensor disposed within the base cabinet and configured to detect the presence of fluid within the bottom pan, the at least one sensor configured to measure an amount of detected fluid within the bottom pan and compare the amount of detected fluid to a first threshold,
      an imaging apparatus disposed within the base cabinet and operatively coupled to the sensor such that the imaging apparatus is activated by the sensor when the amount of detected fluid is greater than the first threshold, the imaging apparatus obtaining at least one image of the bottom pan when the imaging apparatus is activated by the sensor, and the leak detection assembly being configured to determine the amount of the detected fluid contained within the bottom pan based upon the at least one image, and
      a transmission apparatus configured to transmit the at least one image to a remote device upon activation of the imaging apparatus for verifying the presence of detected fluid within the bottom pan, configured to transmit a notification signal to the remote device when the amount of detected fluid is less than a second threshold, and configured to transmit a shutdown notification signal to the remote device when the amount of detected fluid exceeds the second threshold,
   wherein the notification signal characterizes the amount of detected fluid being less than the second threshold as indicating a false alarm event.

2. The fuel dispenser of claim 1, wherein the at least one sensor is configured to detect a change in weight of the bottom pan when fluid is collected in the pan.

3. The fuel dispenser of claim 1, wherein the control system is coupled to the at least one sensor and to the at least one imaging apparatus, and wherein the control system controls the sensor and activates the imaging apparatus.

4. The fuel dispenser of claim 1, wherein the control system receives the at least one image.

5. The fuel dispenser of claim 1, wherein the at least one sensor is mounted within the base pan.

6. The fuel dispenser of claim 1, wherein the at least one imaging apparatus is mounted to a sidewall of the base cabinet.

7. The fuel dispenser of claim 1, wherein the at least one sensor comprises a pressure sensor.

8. The fuel dispenser of claim 1, wherein the at least one imaging apparatus is configured to take periodic images of the bottom pan.

9. The fuel dispenser of claim 1, wherein the leak detection assembly is configured to automatically disable the fuel dispensing components disposed in the housing upon detection that the amount of sensed fluid is greater than the preset threshold within the bottom pan by the at least one sensor.

10. The fuel dispenser of claim 1, wherein the imaging apparatus is configured to obtain the at least one image of the bottom pan only when activated by the sensor.

11. The fuel dispenser of claim 1, wherein the bottom pan has a plurality of regions, the leak detection assembly comprises a plurality of leak detection assemblies, and each of the plurality of leak detection assemblies corresponds to one of the plurality of regions.

12. A fuel dispenser, comprising:
   a control system;
   a sensor configured to detect the presence of fluid in a bottom pan of a base cabinet of a fuel dispenser, and to output a detection signal containing data representing detection of the presence of fluid when the amount of detected fluid exceeds a first fluid threshold;
   an imaging device positioned within the base cabinet and configured to acquire at least one image of the bottom pan in response to receipt of the detection signal and output an imaging signal to the control system containing data representing the at least one image in response to the detection signal; and
   a notifier configured to generate and transmit at least one notification;
   wherein the control system is configured to determine an amount of the detected fluid contained within the bottom pan based upon the at least one image; and
   wherein the control system is configured to transmit a signal to the notifier when the amount of detected fluid is less than a second fluid threshold, the notifier transmitting a notification to a user, the notification characterizing the amount of the detected fluid being less than the second fluid threshold as indicating a false alarm event, and the control system is configured to transmit a shutdown notification signal to the notifier when the amount of detected fluid exceeds the second fluid threshold.

13. The fluid dispenser of claim 12, wherein the sensor is configured to output the detection signal to the imaging device.

14. The fluid dispenser of claim 12, wherein the sensor is configured to measure an amount of the detected fluid and output the detection signal including data representing the measured amount of the detected fluid.

15. The fuel dispenser of claim 14, wherein the control system is configured to receive the detection signal from the sensor, and output the detection signal to the imaging device when the measured amount of the detected fluid exceeds the first fluid threshold.

16. The fuel dispenser of claim 12, further comprising a pump positioned within the base cabinet and configured to draw a fluid fuel from a reservoir, wherein the control system is configured to transmit a shutdown signal to the pump when the amount of detected fluid exceeds the preset fluid threshold, the shutdown signal causing the pump to halt draw of fluid fuel from the reservoir upon receipt.

17. The fuel dispenser of claim 12, further comprising a user interface and a pump, the user interface being configured to:
receive the imaging signal from the imaging device,
display the at least one image, and
receive a first user input after display of the at least one image and transmit a shutdown signal to the pump; and the pump being positioned within the base cabinet and configured to:
draw a fluid fuel from a reservoir prior to receipt of the shutdown signal, and
halt draw of the fluid fuel from the reservoir upon receipt of the shutdown signal.

18. The fuel dispenser of claim 17, wherein the user interface is mounted to a frame of the fuel dispenser.

19. The fuel dispenser of claim 12, further comprising a user interface, the user interface being configured to:
receive the imaging signal from the imaging device,
display the at least one image, and
receive a second user input after display of the at least one image and transmit a notification signal to the notifier.

* * * * *